United States Patent [19]
Hoth et al.

[11] Patent Number: 5,710,723
[45] Date of Patent: Jan. 20, 1998

[54] METHOD AND APPARATUS FOR PERFORMING PRE-EMPTIVE MAINTENANCE ON OPERATING EQUIPMENT

[75] Inventors: Donald K. Hoth, Setauket; C. Kenneth Morrelly, Centerport, both of N.Y.

[73] Assignee: Dayton T. Brown, Bohemia, N.Y.

[21] Appl. No.: 417,116

[22] Filed: Apr. 5, 1995

[51] Int. Cl.$^6$ ...................................................... G06F 17/60
[52] U.S. Cl. .................... 364/551.01; 364/554; 395/912
[58] Field of Search ................. 364/551.01, 551.02, 364/552, 554, 557, 558, 571.03, 578, 508; 395/900, 902–907, 911–915

[56] References Cited

U.S. PATENT DOCUMENTS

| | | |
|---|---|---|
| 4,520,674 | 6/1985 | Canada et al. . |
| 4,559,600 | 12/1985 | Rao ........................................ 364/551 |
| 4,644,479 | 2/1987 | Kemper et al. ......................... 364/550 |
| 4,866,635 | 9/1989 | Kahn et al. ............................. 364/200 |
| 4,985,857 | 1/1991 | Bajpai et al. . |
| 4,989,159 | 1/1991 | Liszka et al. . |
| 5,023,045 | 6/1991 | Watanabe et al. ....................... 364/148 |
| 5,122,976 | 6/1992 | Bellows et al. . |
| 5,175,797 | 12/1992 | Funabashi et al. . |
| 5,210,704 | 5/1993 | Husseiny ............................. 364/551.01 |
| 5,251,151 | 10/1993 | Demjanenko et al. . |
| 5,255,347 | 10/1993 | Matsuba et al. . |
| 5,258,923 | 11/1993 | Imam et al. . |
| 5,305,235 | 4/1994 | Izui et al. . |
| 5,333,240 | 7/1994 | Matsumoto .............................. 395/23 |
| 5,412,584 | 5/1995 | Umeno et al. ............................ 364/558 |

*Primary Examiner*—James P. Trammell
*Attorney, Agent, or Firm*—Jay H. Maioli

[57] ABSTRACT

A pre-emptive maintenance system for performing maintenance and process assurance on run-critical equipment employs an intrinsic health monitor that includes a number of sensors that are used with an operating equipment or machine to generate a set of intrinsic physical signatures that are products of the primary performance characteristics of the operating equipment. These signatures are nonfunctional parametrics that are consistent and reliable indicators of the normal operation of the equipment and statistical norms are set during an initial learning mode using neural processors and the outputs from the sensors. Thereafter, the sensor outputs are monitored and analyzed using the statistical norms to predict the probabilities of future failures of the operating equipment. By using the intrinsic health monitor an advance in the field of equipment maintenance and process assurance is provided in the approach to maintenance being a pre-emptive procedure.

28 Claims, 11 Drawing Sheets

METHOD AND APPARATUS FOR PERFORMING PRE-EMPTIVE MAINTENANCE ON OPERATING EQUIPMENT

BACKGROUND OF THE INVENTION

1. Field of the Invention

This invention relates generally to a method and apparatus for detecting impending failure of operating equipment and, more particularly, to a method and apparatus for sensing equipment parameters and performing statistical and neural processing of the detected parameters for the purpose of prognosticating the future operational status of the equipment.

2. Description of the Related Art

The earliest attempts at maintenance were simply run to failure, that is, machinery or operating equipment would simply be run until a failure occurred and then the equipment was repaired and the relevant operation continued. Because the unexpected failure of machinery and the interruption of industrial processes can cause great economic loss as well as environmental harm, other maintenance approaches have been found to be necessary. For example, pumps, motors, transformers, pipes, and other machine devices involved in the processing, transport, and distribution of chemicals, petroleum, and waste often cause considerable environmental damage and economic loss, as well as hazards to human safety, when an unexpected machine/device or process failure occurs.

Thus, it is seen that all of these adverse effects have required the run to failure maintenance approach to evolve into one that can detect impending operating device failure prior to the actual occurrence of such a failure. The concepts of preventive maintenance as well as predictive maintenance are presently being used. Preventive maintenance is an approach that requires the engineer or process manager to make some assumptions, which are typically conservative, as to when failure is likely to occur. As a consequence of these assumptions, the equipment is maintained by means of rigid schedules based on elapsed time of operation. Typical of this approach are: 1) lubricate main bearings every 50 hours, 2) replace oil seals every 100 hours, and so forth. Following this approach, the machines and operating equipment are maintained, repaired, or replaced prior to the time that such actions are actually necessary. Therefore, the preventive maintenance approach, which is dependent on excessive record keeping, can be costly yet still not be a fool-proof way for preventing unanticipated failures. For example, there may still be latent failures based on errors of manufacture, errors in factoring the maintenance schedule or induced failures caused by misalignments and the like at the time the actual equipment was installed.

On the other hand, predictive maintenance is a more current technique that relies on expert knowledge of specific machinery, which knowledge is derived through testing and experimental data. Predictive maintenance is implemented as periodic inspections which may include oil samples, infra-red thermography or vibration monitoring in order to detect known undesirable patterns which may imply a maintenance action, for example, oil contains too much hydrocarbons; time to change it. The relevant inspections are performed using portable equipment and generally an analysis is conducted "on site" or such analysis may be performed at a central processing facility using data collected by the portable data equipment. For example, vibration monitoring is performed with hand-held portable data collectors which include a probe placed against a machine and held in contact with the machine for a few seconds in order to measure vibration spectral characteristics. Certain spectral signatures would imply that a specific bearing is wearing out and should be replaced. The monitoring may be performed on a daily, monthly, or even a quarter-annually basis. Among the many drawbacks of such a monitoring scheme, is that it is labor intensive. Furthermore, the expert diagnostic analysis that can be performed on the data is limited because only a brief "snap shot" of the data is obtained for analysis. In addition, such a method does not take into account equipment loading nor environmental variables such as ambient temperature.

Examples of such vibration detection and analysis systems are shown in U.S. Pat. Nos. 4,520,674 and 4,985,857. These systems all suffer the drawbacks noted above relative to the predictive maintenance systems, including excessive labor and too early replacement or maintenance action.

OBJECTS AND SUMMARY OF THE INVENTION

It is an object of the present invention to provide a method and apparatus for performing pre-emptive maintenance on operating equipment that can eliminate the above-noted defects inherent in the previously proposed systems.

Another object of the present invention is to provide an improved maintenance system in which maintenance is performed based upon an analysis of detected physical parameters of the operating equipment.

A further object of the present invention is to initially perform a learning operation using detected information from the operating equipment so that knowledge can be gained for use in determining the future indications of failure or out of tolerance performance.

In accordance with an aspect of the present invention, the operating equipment is operated to generate a set of intrinsic physical signatures that are products of the primary performance characteristics of the operating equipment. These signatures are nonfunctional parametrics that are consistent and reliable indicators of normal operation of the equipment. By carefully detecting and analyzing these physical parameters one can confirm an equipment and/or process operational status relative to normal or abnormal operation. Furthermore, by processing the parametric data, it is possible to provide indications of future failure or impending out of tolerance performance of the operational equipment.

In order for the present invention to determine that the operating equipment is performing within its so-called norms and to then detect significant deviations from normal, an initial learning mode is selected and a learning operation is performed. The present invention detects data from the operating equipment at periodic intervals within a one hour time period and forms statistical norms at the end of each hour for each sensor and for several frequency bands of vibration in regard to the vibration sensor. During the hourly calculation operation, dependent norms in the form of average value correlations are obtained for each vibration frequency band with respect to temperature and load. Independent norms are also obtained with respect to the ambient to unit temperature difference and the electrical current to load ratio. The intervals of the data acquisition during the monitor mode are identical to the periodic data intervals in the learn mode described above. Hourly calculations are also performed in monitor mode in a similar manner to those of learn mode. An additional failure probability calculation is performed in monitor mode which compares the learn mode norms with the monitor mode data obtained each hour, and the potential for failure is estimated.

The above and other objects, features, and advantages of the present invention will become apparent from the following detailed description of illustrative embodiments to be read in conjunction with the accompanying drawings in which like reference numerals represent the same or similar elements.

DETAILED DESCRIPTION OF PREFERRED EMBODIMENTS

The present invention provides a system utilizing specific electronic equipment following predetermined operating programs that determines the future general condition of a machine. More specifically, pre-emptive maintenance is a system for performing maintenance and process assurance on run-critical equipment, which is equipment that must operate in order so assure a process and that if otherwise interrupted would cause significant environmental or financial damage. The system of pre-emptive maintenance utilizes intrinsic health monitoring to discover impending machine/process failure; uses expert diagnostic testing to determine the specific failure that is going to occur; and uses data from a reference library to apply the appropriate maintenance action in order to keep the process operating without interruption.

Figure 1:
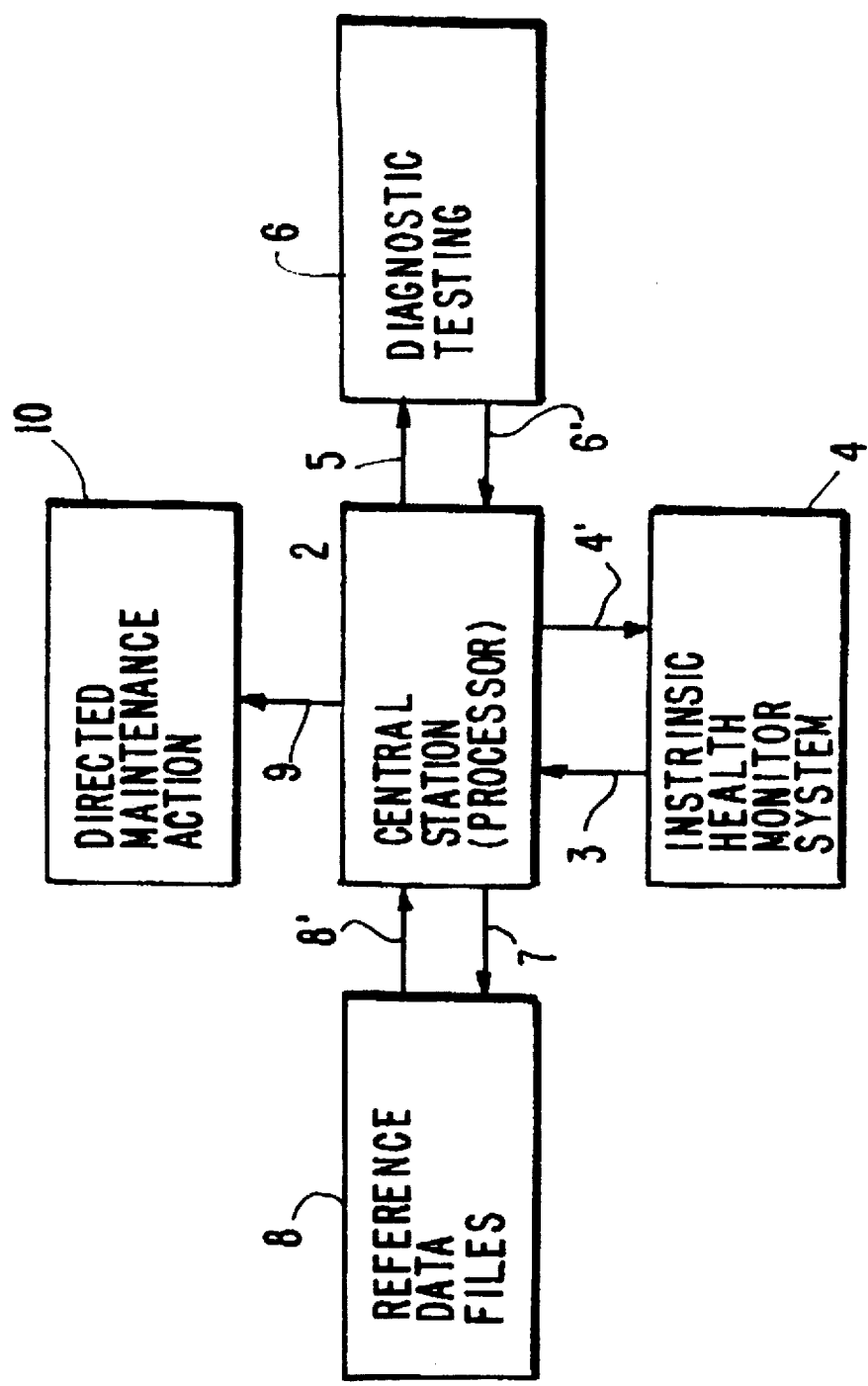
FIG. 1 is a schematic in block diagram form of an overall system according to an embodiment of the present invention.

FIG. 1 represents the functional elements of the above-described system, wherein a processor forms a central station 2 that sends out a request for data on line 3 to an intrinsic health monitor system 4 and receives failure probability alarms on line 4'. That is, the central station 2 is electronically linked to the intrinsic health monitor system 4 and receives failure probability status reports on demand which are estimates of the so-called health of the equipment being monitored. The central station 2 can be in the form of a PC-based computing system that includes a diagnostic testing library 6 so that the processor 2 directs the diagnostic testing to be performed by a request on line 5 and the test results are fed back on line 6' to the central station 2 to identify the failure. The processor 2 can then interrogate a reference data bank 8 that includes a library of possible maintenance actions for the appropriate work order for the impending identified failure by sending a request for a comparative match on line 7 and then receiving the pattern match characteristics on line 8'. The processor 2 then directs the maintenance action 10 that can include printing a work order for the maintenance personnel or purchasing department and identifying the replacement parts and supplies for the equipment being monitored by sending commands line 9.

Figure 2:
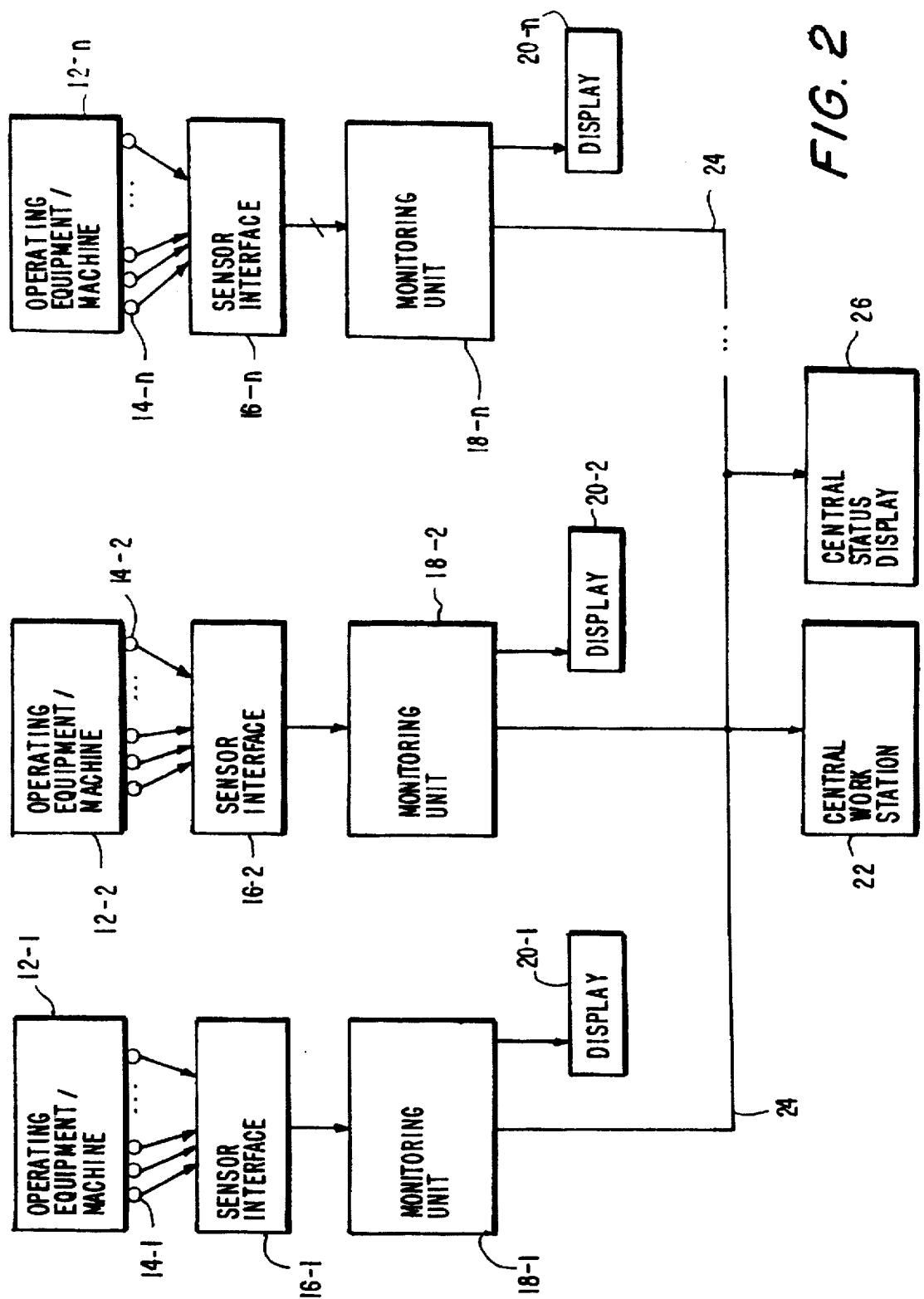
FIG. 2 is a block diagram showing the system of FIG. 1 in more detail.

A more detailed view of the overall system is shown in FIG. 2, wherein one unit of a typical operating equipment or machine 12-1, which may be a turbine engine, a pump, motor, fan, compressor or any other machine-driven apparatus, is shown. Nevertheless, the present invention is intended to function within an overall operating system including a number of units of operating equipment, so that a number of different machines can be maintained following the present invention. For example, another unit of operating equipment 12-2 may be monitored as well, and the number of machines is generally unlimited up to 12-n. The operating parameters of the operating equipment 12-1 are sensed by a number of sensors 14-1 which may include a vibration sensor, a sensor for determining the machine load, a sensor for sensing the machine temperature, a sensor for sensing the electrical current being drawn by the operating equipment, and a sensor for sensing the ambient temperature. All of the various signals detected by these several sensors 14-1 are fed through a sensor interface unit 16-1 to a monitoring unit 18-1, which is shown in more detail hereinbelow. As will be described below, monitoring unit 18-1 provides local information in the form of a status display 20-1 to the operator on site at the location of the operating equipment 12-1. In addition, the monitoring unit is connected to a central work station 22 via lines 24 that may comprise conventional telephone lines. Located in the same location as the central work station 22 is a remote status display 26 for displaying the status of the operating unit 12-1, 12-2, . . . 12-n.

Only one central work station 22 is required to support a number of monitoring units 18-1, 18-2, . . . 18n, which are the primary data gathering elements in this embodiment. Each monitoring unit 18-1, 18-2, . . . 18-n gathers data by its separate sensor array 14-1, 14-2, . . . 14-n and transmits the data over the telephone lines 24 in this embodiment to the central work station 22. The data is gathered periodically, typically in ten to fifteen minute intervals, and then the monitoring unit 18-1 processes the periodic data readings and provides an appraisal of the equipment status, that is, normal or not normal. This equipment status is provided on the local display 20-1 and is also transmitted on demand to the central work station 22. The hourly condition evaluations are formed locally in the respective monitoring unit 18-1, 18-2, . . . 18-n that include local processors, as will be shown in FIG. 3 and, thus, require no further processing at the central work station 22. The central work station 22 maintains two separate data bases, one for equipment status displays based on the hourly condition evaluation data and the other for periodic data readings for subsequent analysis using predictive maintenance techniques.

Figure 3:
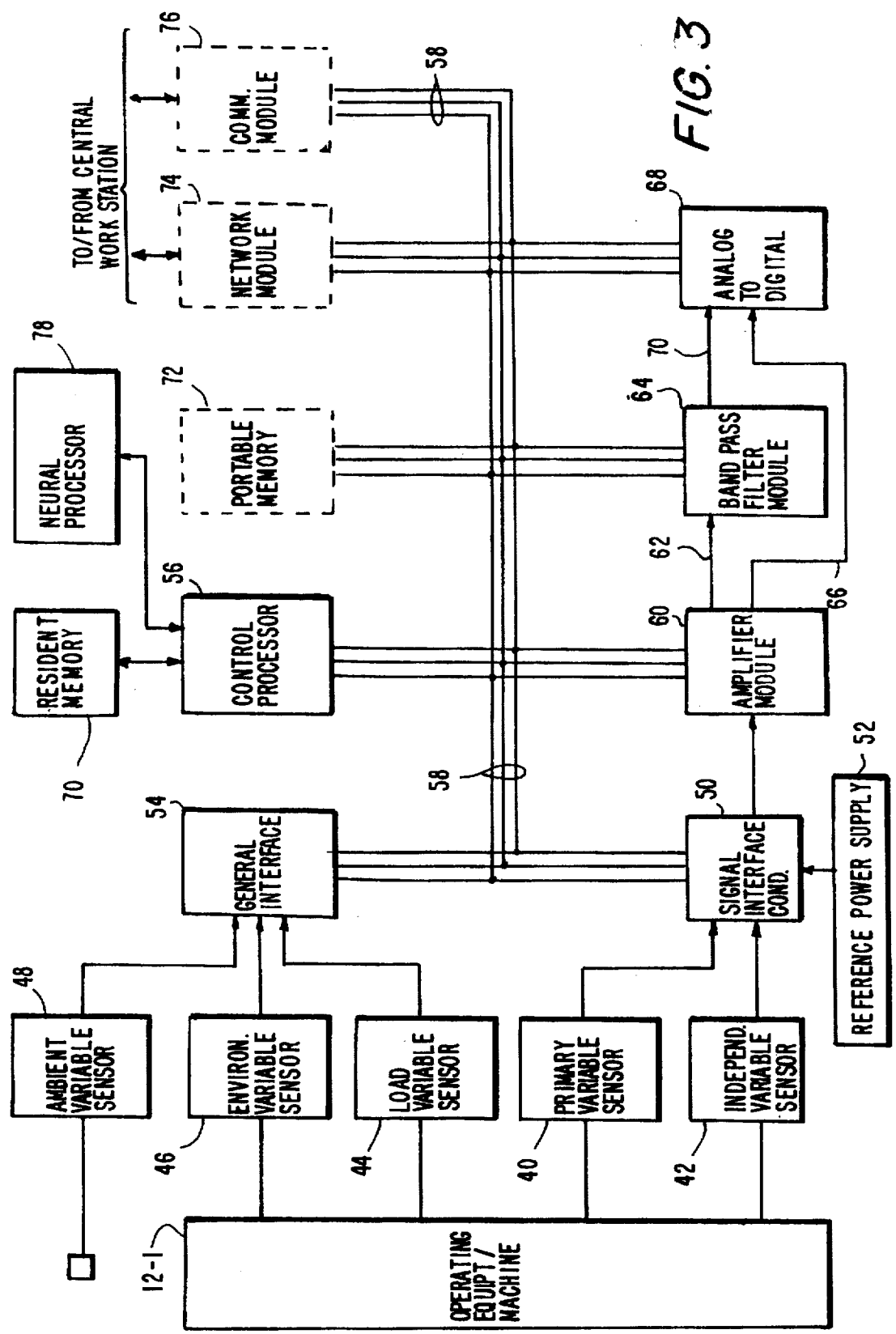
FIG. 3 is a schematic in block diagram form of the monitoring unit used in the system of FIG. 1.

The details of the monitoring unit 18-1 of FIG. 2 are shown in FIG. 3, in which an operating equipment unit or machine 12-1 is connected to be monitored by a primary variable sensor 40, such as a vibration sensor that provides primary intrinsic machine data, an electric current sensor 42 that provides independent intrinsic data, and a load sensor 44 that provides information concerning the load of the machine 12-1 and may comprise a speed, strain, or pressure sensor thereby providing dependent machine intrinsic data. An environment sensor 46 senses the temperature of the machine 12-1 and, thus, provides additional dependent intrinsic data. In addition, the ambient temperature is detected by an ambient temperature detector 48.

The data signals provided by the sensors 40, 42, 44, 46, and 48 are processed by two different signal interface modules comprising the sensor interface 16-1 of FIG. 2. A signal interface conditioner module 50 provides an interface for vibration and current intrinsic data, as provided by the primary variable sensor 40, which detects vibration, and the independent variable sensor 42, which detects machine current. The signal interface conditioner module 50 is provided with a reference voltage from a reference voltage power supply 52 that provides an accurate reference voltage for use in determining the data from the vibration and current sensors 40, 42. A more general interface module 54 provides an interface for the ambient temperature variable sensor 48 and the machine temperature or environment variable sensor 46, as well as for the load variable sensor 44. The general interface module 54 does not require a separate reference power supply to produce the appropriate reference voltages and signal processing. General interface module 54 includes an internal analog-to-digital conversion circuit, so that the received analog data is supplied to a control processor unit 56 via a digital data/control bus 58.

Sensor data processed by the signal interface condition module 50 is transmitted to a programmable gain amplifier/ attenuator unit 60 that adjusts the array data signal for amplitude and desired resolution. The analog vibration data is supplied on line 62 to a programmable bandpass filter 64. The analog electrical current data is transmitted on line 66 to an analog-to-digital convertor 68, which also receives the analog output signal on line 70 from the bandpass filter module 64. Alternatively, both the current data and the vibration data can be bandpass filtered before being converted to digital data. The programmable bandpass filter module 64 provides high and low passband separation of the received data, thereby providing an anti-aliasing function so that the energy content within each band may be processed and stored separately. It is contemplated in this embodiment that five separate bands are provided for separate processing over a continuous total bandwidth of 5 through 5,000 Hz. These five bands might be from 5-50 Hz, 50-200 Hz, 200-500 Hz, 500-2,000 Hz, and 2,000-5,000 Hz, respectively. Not only are these bands presented as typical values but, in fact, the bands need not be continuous over the data spectrum.

In any event, once the data has been converted to digital data in the analog-to-digital convertor 68, it is placed on the system bus 58 and supplied to the control processor 56 that controls the data acquisition process using a method described hereinafter.

The control processor 56 has a dedicated resident memory 70 that stores all data fed thereto and also stores the operating program for the processor 56. In addition, the monitoring unit 18-1 can also include a so-called portable memory 72 that can be a floppy disc memory or the like, as well as a network module 74 and a communication module 76, which function to permit communication with the central work station 22 over the telephone lines 24, as shown in FIG. 2.

As will be described hereinafter, the control processor 56 performs a learning process as represented by one or more neural processors 78. The control processor 56 also performs data analysis in the monitoring mode.

Figure 4:
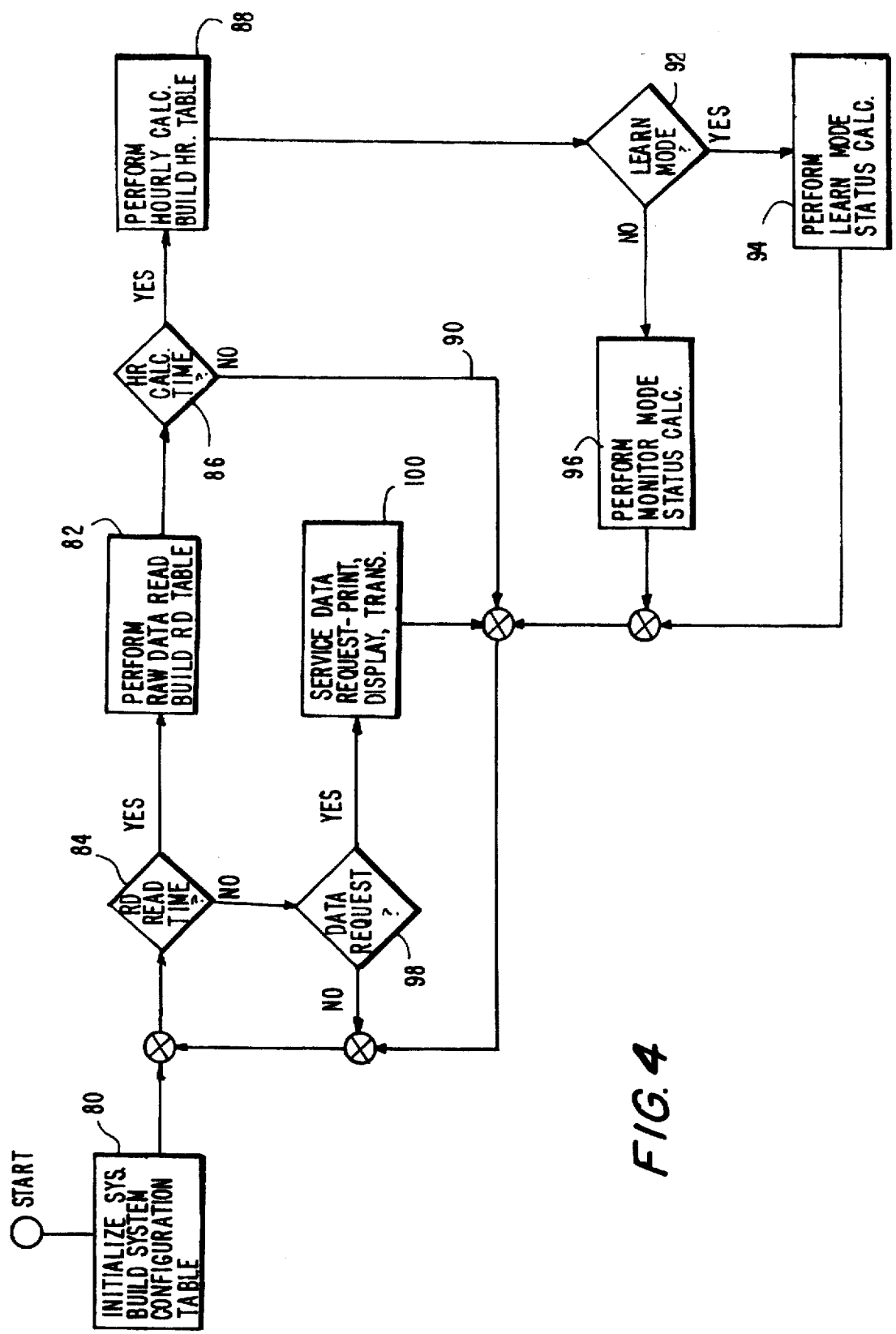
FIG. 4 is a flow-chart showing the operations of executive routine performed by the processor used in the unit of FIG. 3.

The intrinsic health monitoring system operating process is shown in FIG. 4 and consists of an executive process and a number of special purpose routines, which perform sensor data acquisition, hourly average calculations, learn mode status calculations, and monitor mode status calculations.

The executive process performs an initialization routine at 80 upon start-up and also services input/output requests whenever operating time is available. The intrinsic health monitor system executive process of FIG. 4 is a "Ring-Commutator" program; it is not interrupt driven. The executive process sequences from task to task performing each routine in a fixed order based on the system master clock and controls when a raw data read operation 82, which corresponds to sensor data acquisition, will occur as represented at decision step 84. The system master clock also forces the executive process to perform hourly average calculations. The clock is set to initiate an executive commutation sequence every 7.5 minutes and when a sequence is initiated the executive process performs the raw data read (RDR) routine 82 and after completing the RDR the executive process checks in step 86 to see if the hour counter is equal to eight, which is the indication to perform the hourly average calculation (HCR) routine 88. It will be noted that 7.5×8=60 minutes. If the hour counter decision 86 results in a total less than eight, the executive process returns to an "idle mode" as represented by the path 90 and waits for either the next master clock prompt or it services input/output requests. If an hourly average calculation routine was performed at 88, the executive process checks the system mode key in step 92 to see which of the applicable status routines should be performed, either the learn mode status calculations 94 or the monitor mode status calculations 96, both of which are described in detail hereinbelow. When either status routine 94 or 96 is completed the executive returns to idle mode 90. If any request for input/output services is received, as represented at step 98, during the data acquisition, status, or calculation routines, the request is not performed at operation 100 until the executive process returns to the idle mode 90. Input/output requests are held in the communications module buffer until serviced during the next idle period. It has been found that the amount of time generally available for I/O service during a 7.5 minute time period is approximately 4 minutes.

Figure 5:
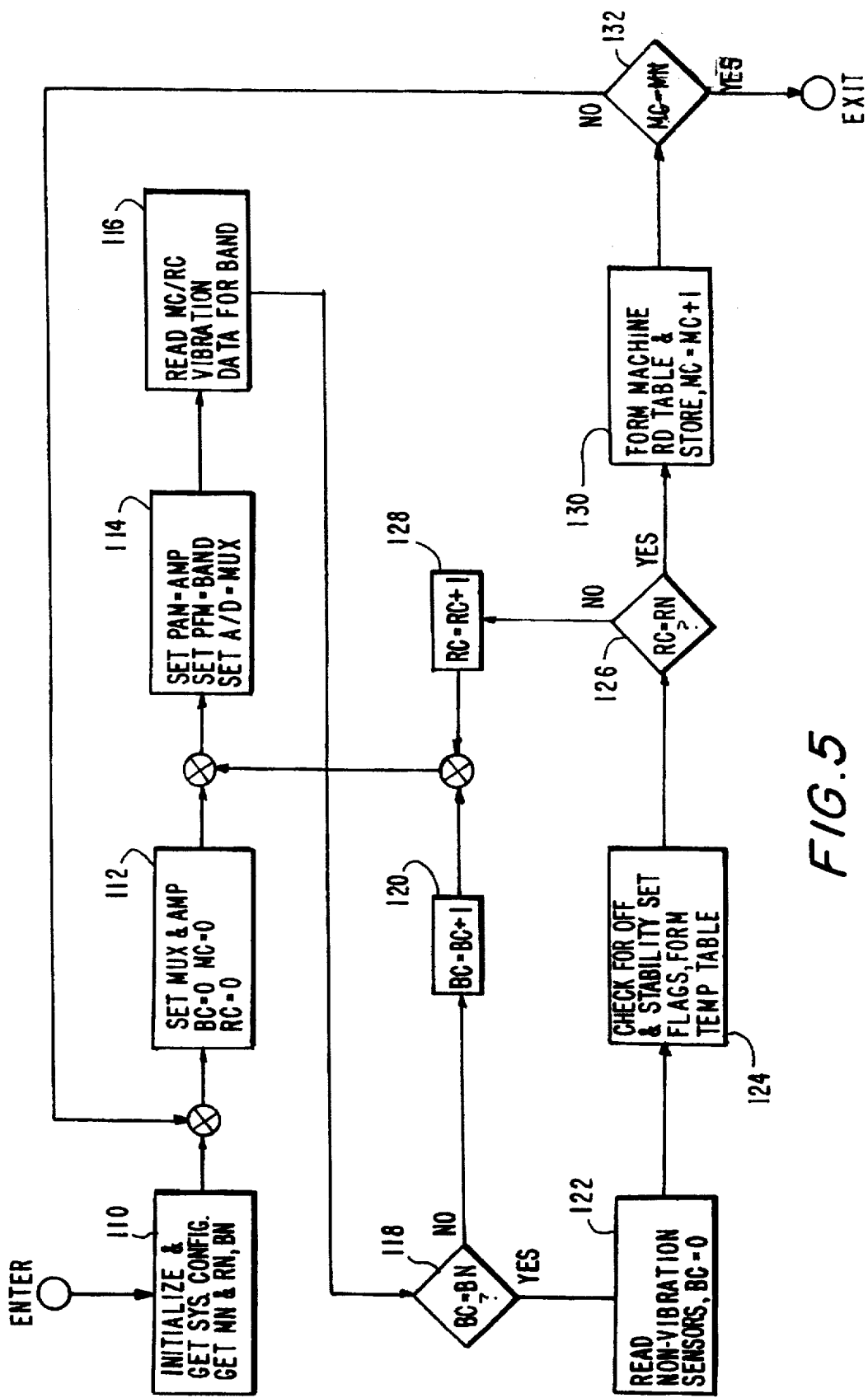
FIG. 5 is a flow-chart showing the operations of the raw data acquisition operations of the processor in the unit of FIG. 3.

The raw data read routine 82 of FIG. 4 (RDR) is shown in detail in FIG. 5 and operates to execute the acquisition and storage to memory of the sensory data for the machines that are being monitored. The primary task of the raw data read routine 82 is to build a raw data (RD) table of sensor values for each parameter that is being monitored. The RDR routine 82 executes thirty readings from each non-vibration sensor and one hundred fifty (5×30) readings from each vibration sensor. In the initialize step 110, the number of machines (MN), the desired number of readings (RN), and the desired number of frequency bands (BN) are entered. Next, in step 112 the system configuration comprising the sensors and machine assignments are set and the amplifiers (not shown) are set as well. Also in step 112 the machine count, band count, and read count are all set to zero. In step 114 the amplitude for the pulse amplitude modulation and the band for the pulse frequency modulation are set and the analog-to-digital converters are set for the system configuration. In step 116 the machine count and readings count are read and the vibration data for the particular band is read. After the vibration sensor data is read in step 116 it is checked in step 118 whether the band count is equal to the desired number of bands and, if not, the band count is incremented in step 120 and steps 114 and 116 are repeated. If all of the desired bands have been read, as determined in step 118, the sensors other than the vibration sensors are read in step 122.

Next, in step 124 it is checked whether there are any OFF flags or stability flags set, and then a temperature table is formed from the data read in step 122. It is then checked in step 126 whether the readings count has reached the desired number and, if not, the readings count is incremented in step 128 and the preceding steps are repeated. If the desired number of readings, as determined in step 126, has been reached a machine reading table is formed and stored in step 130 and the machine count is incremented. Next, it is determined whether all the machines in the operating system have been read by checking in step 132 whether the machine count equals the number of machines being monitored and, if not, all of the preceding steps are repeated. If all of the machines to be monitored have been read out, the raw data read routine is exited.

In checking for the off condition and for stability in step 124, if the current flow equals zero that means that the machine is off, and the off flag is set. If the load readings vary beyond established load limits then the stability flag is set. The stability flag permits data to be tagged so as not to contaminate valid norms during hourly calculations. A maximum of three load conditions may be established.

Thus, each value in the RD table is an average value, obtained with a statistical confidence equal to 95%. The routine performs two separate checks on each reading obtained from the system sensors. It checks that the machine being monitored is running and that the machine leading is stable during the raw data read period. If either condition exits, that is, the machine is off or the load changes during the data acquisition, the data will be invalid. If the machine is in the off condition during any reading, flag-A is set; if the load has changed more than ±2%, flag-B is set. RD readings that have either flag set are not used in any further calculations, but they are stored in system memory.

Figure 6:
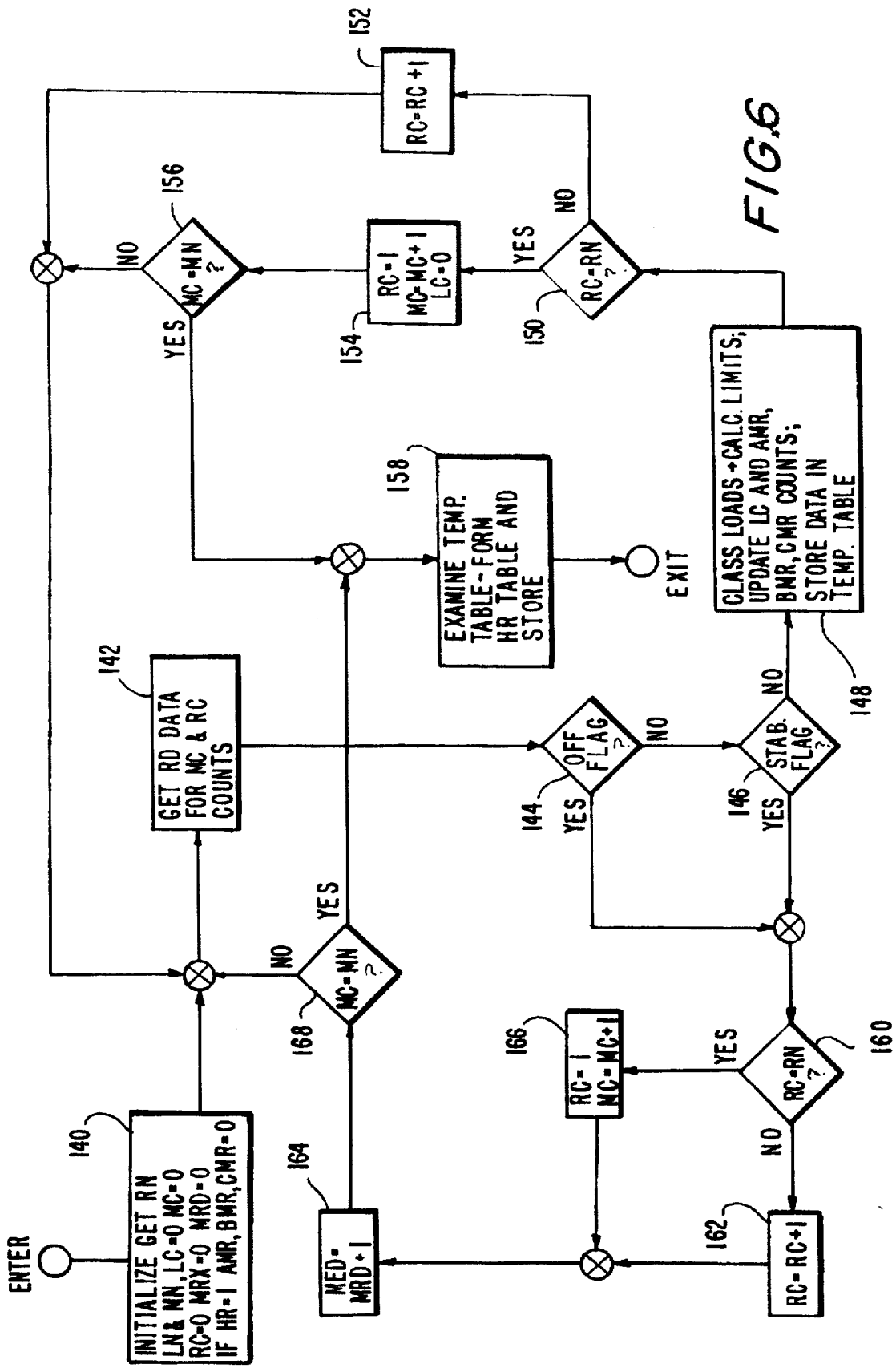
FIG. 6 is a flow-chart showing the operations of the hourly calculations of the processor in the unit of FIG. 3.

The hourly average calculation routine (HCR) shown in FIG. 6 is initiated after every eight operations of the raw data read routine. The task of the hourly average calculation routine is to form hourly averages of the RDR data and to build the hourly reading (HR) table. The HR table data taken each hour is the data that is used for the learn mode and the monitor mode status determination. An additional task for the HCR of FIG. 6 is to calculate certain parametric relationships such as the load to current ratio LC and the ambient to unit temperature difference ($T_u - T_A = TL$). The HCR also classifies RD data into load types, which allows all other data to be correlated to the load condition that was present during data acquisition. It will be appreciated that each load condition produces a different set of parametric norms.

In the hourly average calculation routine shown in FIG. 6, the routine is initialized in step 140 in which the load count, the machine count, and the read count are set to zero. Next, in step 142 the raw data RD for the machine count and read count are fetched. There will be eight RD data for each machine. It is checked in step 144 whether an OFF flag is present in the data and if it is set the data is invalid and will not be processed. In step 146 it is checked whether a stability flag has been set in the data and if it is set the data is not processed. If no such flags are found, the machine load at that data time is classified and limits are calculated in step 148. The load count LC and machine read counts AMR, BMR, CMR are updated and the data is stored in the temperature table in step 148 as well. The machine read counts AMR, BMR, CMR represent the number of reads acquired for each of three load conditions. Next, it is determined in step 150 whether the read count RC has reached the desired number RN, here it is five, and, if not, the read count is incremented in step 152 and the raw data fetching step of 142 is repeated. If the desired number of readings as determined in step 150 has been reached then the machine count MC is incremented in step 154 and it is checked in step 156 whether all the machines have been read. If not, the raw data read step 142 is repeated. If all of the machines have been read, then in step 158 the temperature table is examined, the hourly reading table (HR) is formed and stored, and the hourly calculate routine is exited.

If a machine off flag was found in step 144 or an instability flag in step 146, it is checked in step 160 whether the read count has reached the desired number and, if not, the read count is incremented in step 162 and then MRD is incremented in step 164. MRD represents the number of unusable readings. If the read count has not reached the desired number then the machine count is incremented in step 166 and step 164 is next performed. Following step 164 it is checked in step 168 whether the machine count has reached the desired number and, if so, step 158 is performed and, if not, the preceding steps are repeated, starting with step 142.

Thus, it is seen that a special feature of the HCR is that it will not form an hourly average unless at least five valid RD reads of the same machine load condition exist. The HCR will save load type data until additional RD reads, acquired in subsequent hours, fills the requirement of five. In this manner the HCR builds the HR tables for each machine operational hour and stores them in system memory. If an hourly average is not calculated, the average from the previous hour is used.

The learn mode status calculation routine (LSR), shown in detail in FIG. 7, performs an evaluation of the stored HR data tables obtained by the process explained in connection with FIG. 6. The LSR task is to determine if the acquired data constitutes a stable basis for normalcy. It is a premise of intrinsic health monitoring; as described herein, that normalcy consists of a set of stable relationships between the vibrational energy in all frequency bands emanating from an operating machine and machine load, electrical current, and unit temperature. The LSR calculates a twelve hour average and forms a 95% confidence interval, wherein the upper and lower limits of the confidence intervals are expressed as:

$$X_u = X + t \frac{s}{\sqrt{n}} \; ; X_L = X - t \frac{s}{\sqrt{n}} \tag{1}$$

where s equals the deviation of the average and t equals the percentage of the data distributions for eleven degrees of freedom. X is the value of the mean and n is the number of hourly averages used (12).

Figure 7:
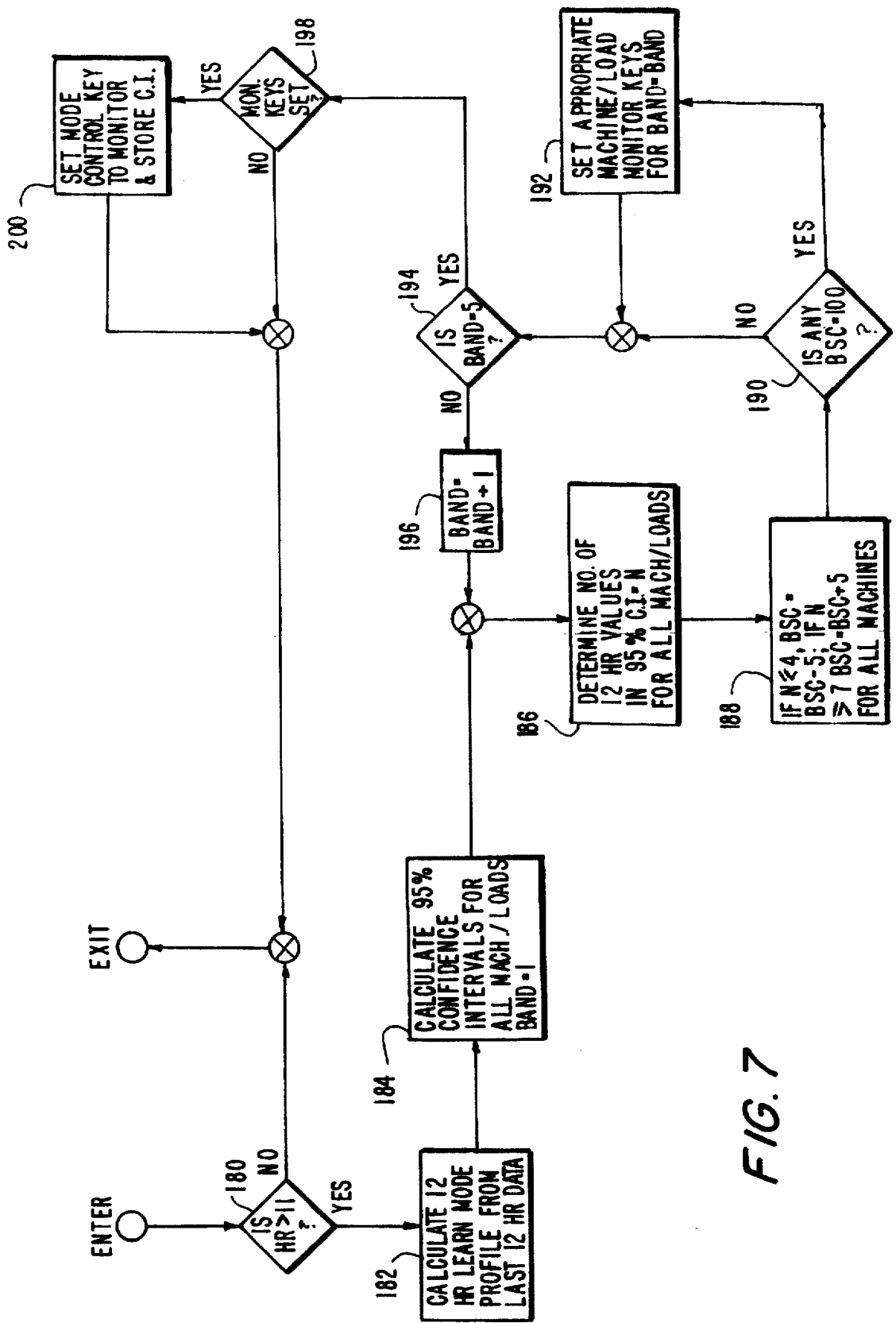
FIG. 7 is a flow-chart showing the operations of the learning mode calculations of the processor in the unit of FIG. 3.

In the learn mode status calculation mode shown in FIG. 7, it is first checked in step 180 whether the hourly count is greater than eleven, that is, whether the hourly count has reached twelve. If so, then in step 182 the twelve hour learn mode profile is calculated from the last twelve hours data. Then, using the equations in (1) above the 95% confidence intervals for all machines and all loads for the first band are calculated in step 184. Next, it is determined in step 186 whether the number of twelve-hour values in the 95% confidence interval equals the desired number of all machines and loads. Then, in step 188 the band stability counters are checked to determine whether the count therein representing data lying between the calculated limits is less than or equal to four, in which case an equal weight, for example, five, is subtracted. On the other hand, if the count number in the band stability counter is greater than or equal to seven, then an equal weight, for example, five, is added to the band stability counters for all machines. Following this weighting operation, it is checked in step 190 whether any band stability count has reached one hundred and, if so, the appropriate machine/load monitor keys for the band under consideration are set in steps 192. If the one hundred count has not been reached, it is checked in step 194 whether the data in all five bands being considered have been learned and if not the band number is incremented in step 196 and steps 186 and 188 are repeated. If all five bands have been learned then it is checked in step 198 whether the monitor keys have been set and, if so, in step 200 the mode control key is set to monitor and the confidence interval is stored. The learn mode status calculate routine is then exited. On the other hand, if the monitor keys are found in step 198 not to be set the routine is exited, as well.

Thus, it is seen that the LSR calculates the confidence interval for all hands of all load conditions for all of the machines being monitored. The LSR determines the number of data points which are between $X_u$ and $X_L$ inclusively, for each confidence interval being calculated, in order to quantify the data distributional stability. If seven or more data points are within the confidence interval, a mathematical weight is added to a stability counter, if less than five data points are within a confidence interval an equal weight is subtracted from the counter. For a count of five or six no value is added or subtracted. When the count of all the hand stability counters (BSC) for any machine equals one hundred, then the machine is considered to be running normally and a basis for subsequently performing the monitor mode has been established. The last function of LSR is to change the system mode control key from the learn mode to the monitor mode if all the hand stability counters for any machine are indicating sufficient stability. When the mode key is set monitor for any machine, the last calculated confidence interval is saved in system memory for the monitor mode status calculations.

Figure 8:
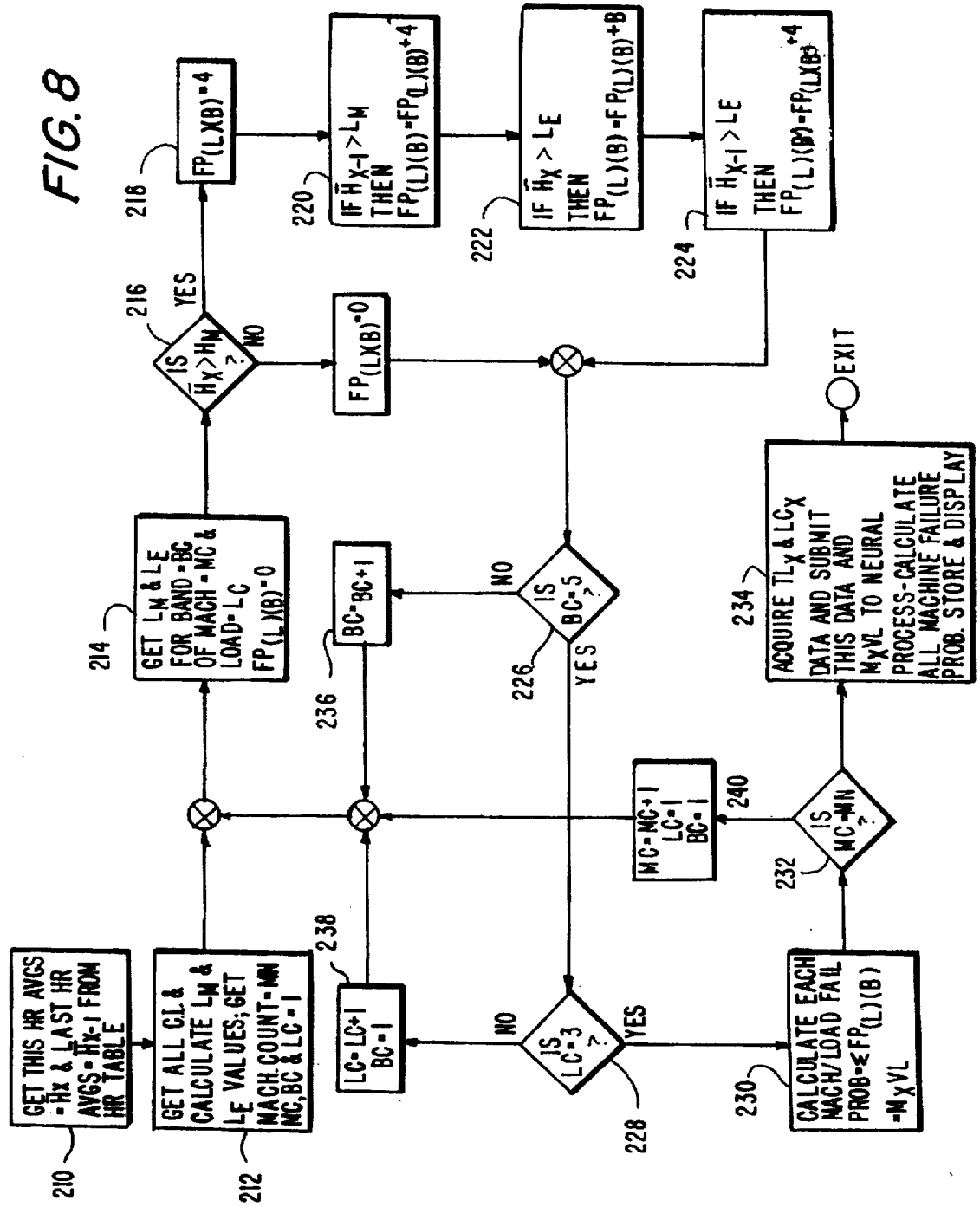
FIG. 8 is a flow-chart showing the operations of the monitoring mode calculations of the processor in the unit of FIG. 3.

The monitor mode status calculation routine (MSR), shown in detail in FIG. 8, performs an evaluation of each machine that is being monitored by comparing the present hourly average data in the HR table to the confidence intervals calculated in the learn mode.

In the monitor mode calculate status process shown in FIG. 8, the first step 210 is to fetch present hourly data and the previous hourly data from the HR table. Then, in step 212 the machine count is gotten from the configuration table and the machine count, load count, and band count are set equal to one. Also in step 212 the confidence intervals CI for all machines, loads, and bands are fetched from memory and the moderate limits ($L_M$) and extreme limits ($L_E$) are calculated from the high and low confidence intervals. In step 214 the specific $L_M$ and $L_E$ values for the machine count, load count, and band count are acquired and a failure probability counter $FP_{(L)(B)}$ for this machine load and band is set to zero. Then, in step 216 the present hourly data is checked against the moderate limit $L_M$ and if it exceeds the moderate limit the neural processor subroutine is entered. More specifically, in the neural processor subroutine step 218 sets the failure probability counter $FP_{(L)(B)}$ for the particular band of the machine equal to four. In step 220 the previous hourly data is compared to check if it exceeds the moderate limit $L_M$ and, if so, the failure probability counter $FP_{(L)(B)}$ is set to the previous value plus four. In step 222 the present hourly data is checked to see if it exceeds the extreme limit LB and, if so, the failure probability counter $FP_{(L)(B)}$ is set to the previous value plus eight. In step 224 the previous hourly data is checked to see if it exceeds the extreme limit and, if so, the failure probability counter is set to its previous value plus four. Next, the band count is checked in step 226 and if it is equal to five, which is the total number of frequency bands being checked in this embodiment, then the load count is checked in step 228. If the load count reflects that all load conditions for this machine have been processed, which is three in this embodiment, then in step 230 the weighted probability for machine failure is calculated for each machine by summing all of the counts in the failure probability counters derived in the statistical processing loop. If the machine count which is checked in step 232 indicates that all the machines in the system have had their data processed then all this calculated failure probability data is submitted to a neural process represented at step 234 consisting of a fuzzy inference operation which combines the dependent and independent data into one conclusion for each machine. These conclusions are stored in system memory and the systems display, described in detail hereinbelow, is updated in step 234. The value $M_x V_L$ is the total vibration for a specific machine and load. Following the display updating, the monitor mode calculate status routine is exited. If in step 226 it is determined that all of the bands had not yet been checked, the band count BC is incremented in step 236 and the preceding steps are repeated. Similarly, if in step 228 it is determined that all of the load conditions for each machine had not been processed, the load count LC is incremented and the band count is reset in step 238 and the preceding steps repeated. Similarly, if in step 232 it is determined that all of the machines had not been processed then in step 240 the machine count is updated and the band and load counts are reset. If in step 216 the hourly data is found not to exceed the moderate limits then the failure probability for a single band value for a given load $FP_{(L)(B)}$ is set to zero in step 240.

Thus, in order to accomplish an evaluation, the MSR utilizes the HR table data for the present hour (N), the previous hour (N−1) and the individual confidence intervals for each vibration band, for a particular load condition. The MSR calculates a moderate limit (±LM) and an extreme limit (±LE) from the high ($X_u$) and low ($X_L$) confidence intervals and submits the $H_x$, $H_{x-1}$, $L_M$ and $L_E$ data to the statistical processor sub-routine that processes the data for each vibrational band of each machine load condition and calculates a weighted probability for potential machine failure. If the failure probability counter for any machine load condition is equal to one hundred, then the load condition failure probability is maximum. Each machine has its own counters for each of its load conditions which counters contain the sum of its individual vibration band counters. Each band counter can contribute a maximum of 20%, (five bands×20=100) or any lesser amount to a lower limit of zero. The final task of the MSR is to submit the load condition failure probability counts, the independently derived differential temperature $T_c$ and load to current ratio data (L/C) to the neural processor and store the resultant hourly status, that is, the failure probability, in system memory and to update the video display of the failure potential of each machine.

Figure 9:
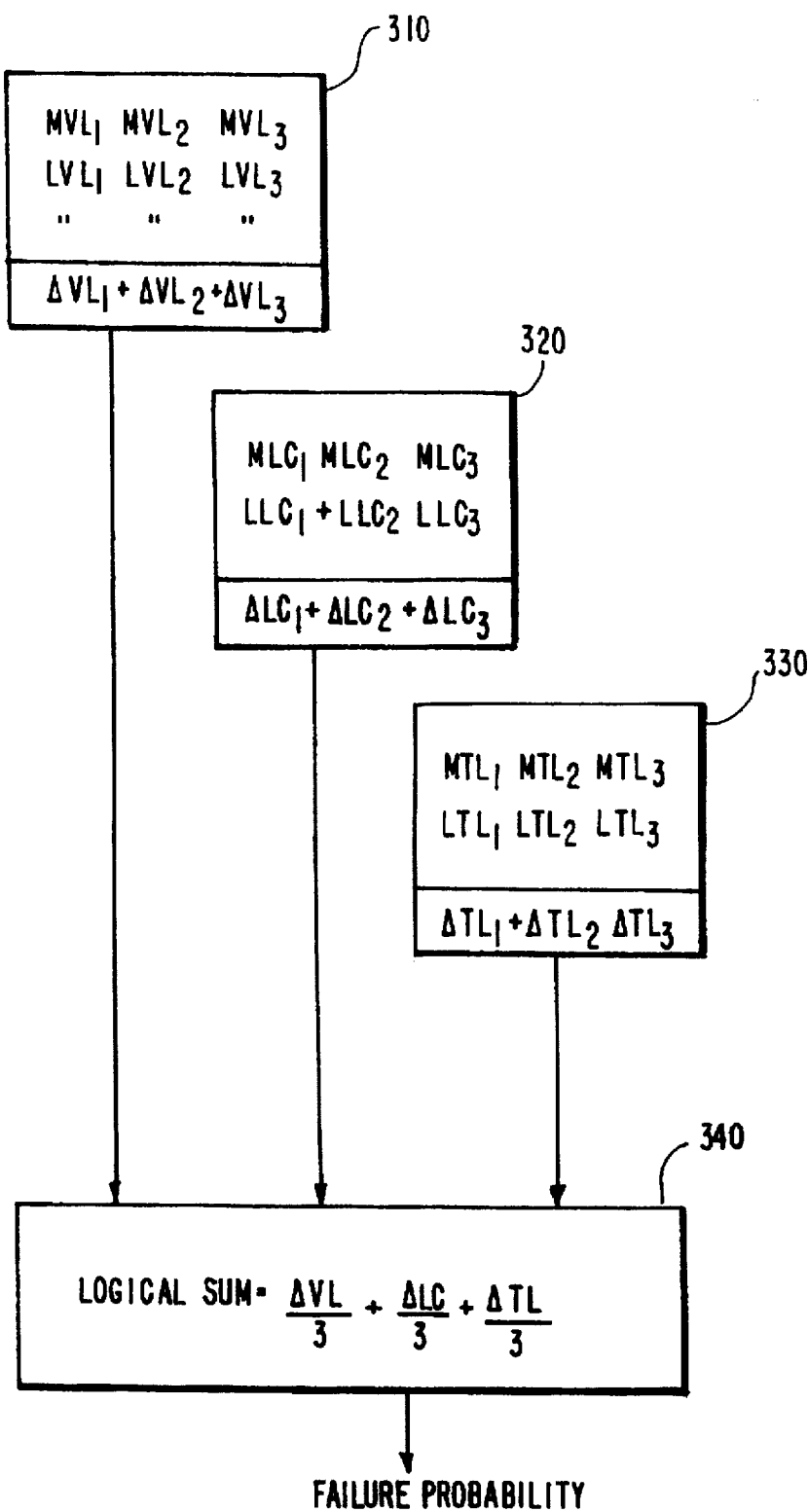
FIG. 9 is a diagram of the operation of the neural processor.

As shown in FIG. 9, the neural process applies antecedent block logic to each set of data produced by the statistical processor. In step 310 the consequent block logical product is the difference between the present hourly vibration data (MVL) and the learned norms (LVL) for the various load conditions of a machine. Similarly, in step 320 the consequent product is the load to current ratio difference between the present hour (MLC) and the learned norms (LLC) and in step 330 the product is the difference between the differential temperatures observed in the learn mode (LTL) and the present hour (MTL). In step 340 the logical sum is formed by dividing each product by three, which is the number of load conditions permitted in this embodiment, and forming a final failure probability sum. Note that any value above 100 is considered to be equal to 100, which is the maximum failure probability value.

Thus, it can be seen that a value of 100 can be achieved by the vibration data alone, with no contribution from the load to current ratio or the differential temperature, or that small vibrational differences from normal can receive large value contributions from both the load ratio and the temperature differential in order to generate a maximum failure probability.

Figure 10:
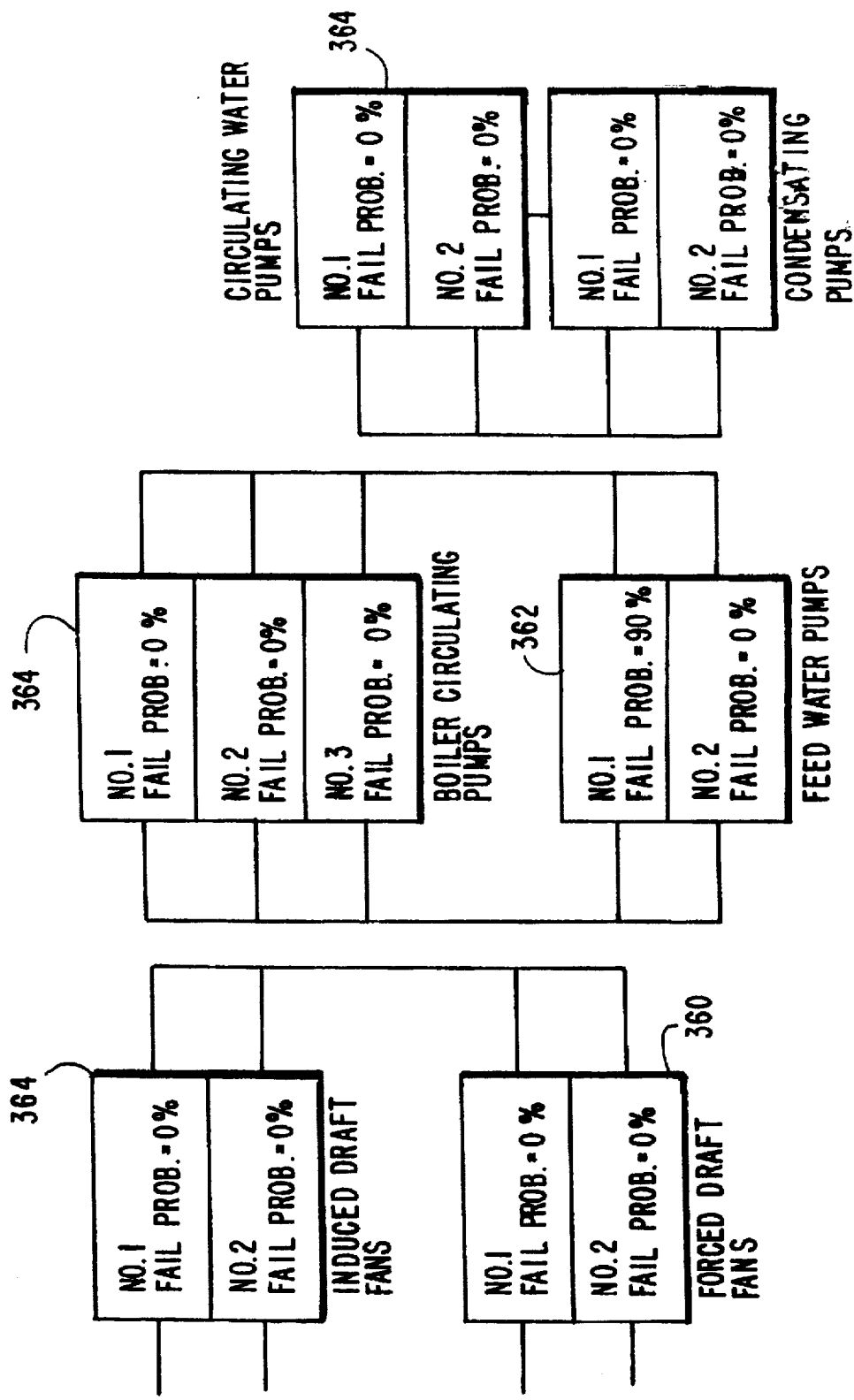
FIG. 10 is a sample of a subsystem overview display.

As described above, a feature of the present invention is a display that may be both a remote display at the central status display unit, as well as a local display for the operator of the particular operating equipment. A typical subsystem overview display is shown in FIG. 10. If it is assumed that the operating equipment is a fuel combustion boiler system, then it is seen in FIG. 10 that the various functional elements of the operating systems, such as the fans, pumps, and the like are suitably labeled. Then an indication is provided that a problem either is likely or is actually almost in a failure mode. For example, in regard to the forced draft fans, an illuminated display 360 indicates that the failure probability is 33%, whereas in regard to the feed water pumps, an illuminated display 362 indicates that the failure probability is 90%. It is contemplated that all of the displays shown typically at 364 in which the failure probability is zero or less than 33% would be illuminated with green color, whereas in the case of the display 360, the display would be illuminated with a yellow color and in the case of the eminent failure shown in display 362, the display would be illuminated with a red color.

Figure 11:
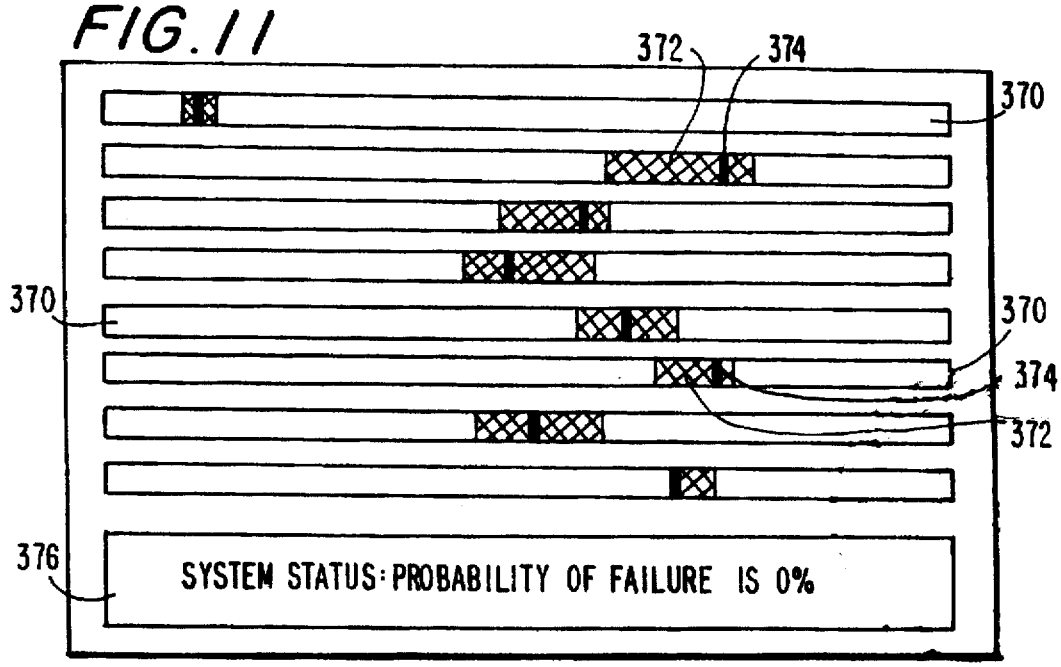
FIG. 11 is a sample of a detailed status display.

FIG. 11 shows a format of a status report as might be displayed on the central status display unit of FIG. 2 and in which each line 370 represents a condition presently being monitored. In each line 370 there is a normal range or band 372 that indicates the normal range of operation for that particular parameter. In addition, the present status is represented by a bar 374 that may fall within the range of the normal status indicator 372. Thus, this shows the current status as it relates to the overall range of normal operation. In addition, at location 376 a statement is provided concerning the system status and probability failure. In this example, because all of the present indicator bars 374 fall within their respective normal ranges 372, the probability of failure is zero percent.

Figure 12:
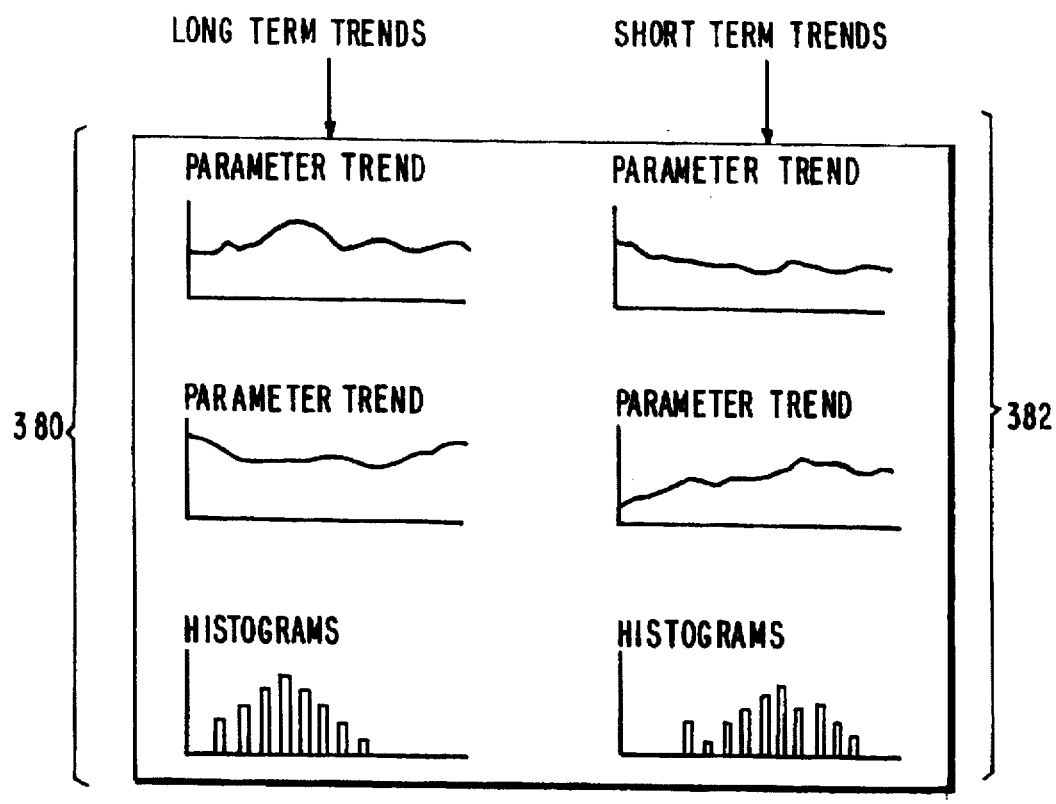
FIG. 12 is a sample of a display for each status bar in the display of FIG. 10.

Another feature of the present invention is the ability to provide a display relating to a trend of operating parameters, as well as a historical profile. FIG. 12 represents typical displays that might be provided at the central status display unit in FIG. 2, in which parameter trends and a histogram are provided both for long term trends in an area 380 and short term trends in area 382. The parameters would, of course, be labelled so that the person monitoring the central display station would immediately know that, in fact, the vibration is increasing or the operating temperature is increasing or the like.

Based upon the above description, it is seen that the present invention provides a pre-emptive maintenance system that includes a central work station with a video display that is remote from a number of various industrial sites and which is connected to each site by telephone lines. The central work station may comprise a microcomputer and includes a keyboard, resident memory, a mouse, a modem, and the like. The video display that provides various displays, such as shown in FIGS. 10, 11, and 12 may be a color monitor and is used to display the machinery status/sensor data that is acquired by the central work station over the telephone communication lines from the several distant transmitting stations located at the various industrial sites. The distant stations provide on-site monitoring of the industrial facilities, which typically consist of machinery that operates an industrial process. The system equipment located at each cite includes the intrinsic health monitoring unit, a local display unit, and a number of condition sensors relative to each machine that is being monitored. If a number of monitoring units are located at a single industrial site, then one of the monitoring units will be a master unit and can be connected to each of the other monitoring units by a local area network. The master unit transmits all data to the local display as well as to the central work station.

Each monitoring unit of the system according to the present invention is an identical hardware apparatus that performs identical methods and that provides parameter monitoring of a number of machines for display or transmission of display data to a central work station. Each monitoring unit includes a number of sensor signal conditioner modules, as well as a reference voltage power supply, that receives the sensor inputs, a programmable amplifier module, a programmable bandpass filter, and a control processor module. In addition, in order to permanently retain the intrinsic parameter data each monitoring unit includes a resident memory which provides a permanent record of the data.

Although the present invention has been described hereinabove with reference to the preferred embodiment, it is to be understood that the invention is not limited to such illustrative embodiment alone, and various modifications may be contrived without departing from the spirit or essential characteristics thereof, which are to be determined solely from the appended claims.

What is claimed is:

1. A system for providing future failure probability information for operating equipment, comprising:

a plurality of sensors arranged proximate the operating equipment and including a primary intrinsic parameter sensor, a dependent operational load parameter sensor, a dependent operational parameter sensor, and an independent operational parameter sensor;

monitoring means located at a same location as the operating equipment and connected to receive data signals produced by said plurality of sensors and including a control processor operating an artificial intelligence algorithm for processing said data signals initially according to a learning procedure and subsequently according to a monitoring procedure whereby energy contents in discrete portions in the data signals produced by said plurality of sensors are evaluated and producing evaluation signals; and work station means connected to receive said evaluation signals from said monitoring means and including a display for providing a visual display representing said evaluation signals.

2. The system according to claim 1, wherein said work station means is located at a different location than the operating equipment.

3. The system according to claim 1, wherein said work station means is connected to said monitoring means by one of commercial telephone lines, local area network, wide area network, cellular network, satellite communications, or direct wire.

4. The system according to claim 1, wherein said monitoring means includes a second display located at the same location as the operating equipment for providing a visual display representing said evaluation signals.

5. The system according to claim 1, wherein said monitoring means includes: a reference power supply, and a signal interface unit connected to said primary intrinsic parameter sensor and to said reference power supply for referencing a data signal from said primary intrinsic parameter sensor to a reference voltage from said reference power supply.

6. The system according to claim 5, wherein said monitoring means further comprises a programmable attenuator/amplifier receiving an analog output signal from said signal interface unit and a digital-to-analog converter for converting an output signal from said programmable attenuator/amplifier to a digital signal.

7. The system according to claim 5, wherein said signal interface means provides a digital signal based on the data signal from said primary intrinsic parameter sensor, wherein said monitoring means further comprises a digital system bus connected to said digital signal and wherein said control processor is connected to said system bus for receiving said digital signal and performing a statistical analysis using said artificial intelligence algorithm to produce said evaluation signals.

8. The system according to claim 1, wherein said monitoring means further comprises a a signal interface unit having a digital-to-analog converter for converting at least a data signal from said primary intrinsic parameter sensor to digital data for processing by said control processor.

9. The system according to claim 8, wherein said signal interface unit also produces a digital signal from said vibration sensor and said digital signal is connected to said system bus.

10. The system according to claim 8, wherein said monitoring means further comprises a neural processor connected to said control processor for performing said learning procedure using statistical analysis to establish a set of stable relationships between data from said primary intrinsic parameter sensor and data from said dependent operational load sensor, said dependent operational parameter sensor, and said independent operational parameter sensor, respectively.

11. The system according to claim 8, wherein said control processor includes means for performing a summary operating equipment failure probability based on fuzzy logic.

12. The system according to claim 11, wherein said control processor operates according to an inference engine.

13. The system according to claim 1, wherein said monitoring means includes a programmable bandpass filter receiving an analog data signal from said primary intrinsic parameter sensor for segmenting the data signal into said discrete portions and producing respective outputs for said discrete portions, said outputs being used in said learning procedure for acquisition of a base energy distribution and said outputs being used in said monitoring procedure for acquisition of a comparative energy distribution.

14. The system according to claim 1, wherein said primary intrinsic parameter sensor includes a vibration sensor.

15. A method of evaluating operating equipment to determine a maintenance requirement, comprising the steps of:

sensing a plurality of operating parameters of said operating equipment, including sensing ambient temperature, equipment operating load, and vibration and producing respective data signals;

performing a learning operation on the data signals using statistical processing;

deriving a plurality of operating norms based on results of said statistical processing;

utilizing statistical inference and fuzzy logic for analyzing the data signals based on the derived plurality of operating norms and producing a failure probability conclusion;

transmitting the failure probability conclusion to a location remote from the operating equipment; and displaying the transmitted failure probability conclusion.

16. The method according to claim 15, wherein the step of transmitting includes transmitting the failure probability conclusion over one of commercial telephone lines, local area network, wide area network, cellular network, or satellite communications.

17. The method according to claim 15, comprising the further step of digitally converting the failure probability conclusion prior to the step of transmitting.

18. The method according to claim 15, comprising the further step of performing anti-aliasing filtering on the data signals before the step of utilizing statistical inference and fuzzy logic.

19. The method according to claim 15, wherein the step of displaying includes determining within which one of a plurality of quantitative ranges the transmitted failure probability conclusion falls and displaying each quantitative range in a respective different color.

20. A method of determining maintenance requirements for an operating system including at least one machine, comprising the steps of:

obtaining operating data from the system during operation including obtaining vibration data, operating load data, and ambient temperature data;

forming obtained data into a raw data table;

repeating the steps of obtaining and forming over a first set period of time to produce hourly data;

storing the produced hourly data;

performing learning mode calculations from the stored hourly data, including calculating upper and lower confidence intervals using stored hourly data representing a second set period of time;

determining data values within the upper and lower confidence levels evidencing correct system operation;

performing monitoring mode calculations by comparing present raw data with the data values evidencing correct system operation; and displaying to a user results of the step of comparing.

21. The method according to claim 20, including the further step of checking the operating load data for stability and setting a stability flag in the raw data if successive quantities of the operating load data vary one from another more than a predetermined amount.

22. The method according to claim 21, including the further step of checking the raw data for the presence of the stability flag and, upon the presence of the stability flag, excluding the raw data having the stability flag from the produced hourly data.

23. The method according to claim 20, wherein the first set period of time is set to one hour and the second set period of time is set to twelve hours.

24. The method according to claim 21, wherein the step of obtaining vibration data includes obtaining vibration data over a plurality of discrete frequency bands.

25. The method according to claim 20, including the further step of checking whether said at least one machine is on and setting an off flag in the raw data if it is determined that the at least one machine is not on.

26. The method according to claim 25, including the further step of checking for the presence of the off flag and, upon the presence with the off flag, excluding the raw data having the off flag from the produced hourly data.

27. A system for providing future failure probability information for operating equipment, the system comprising:

a plurality of sensors arranged proximate the operating equipment and including a primary intrinsic parameter sensor, a dependent operational load parameter sensor, and an independent operational parameter sensor; and monitoring means located where the operating equipment is located and being connected to receive data signals produced by said plurality of sensors and including a control processor operating an artificial intelligence algorithm consisting of a learning process and a monitoring process and for producing future failure monitoring signals from said data signals.

28. The system according to claim 27, wherein said monitoring means includes a programmable bandpass filter receiving an analog data signal from said primary intrinsic parameter sensor for segmenting energy contained in said analog data signal into discrete portions for use in obtaining a first energy distribution in said learning process and a comparative, second energy distribution in said monitoring process.

* * * * *